US010518829B2

(12) United States Patent
McKinley et al.

(10) Patent No.: US 10,518,829 B2
(45) Date of Patent: Dec. 31, 2019

(54) LOBED TRACK PIN

(71) Applicant: Caterpillar Inc., Peoria, IL (US)

(72) Inventors: Timothy Allen McKinley, Peoria, IL (US); Zhiyong Hu, Chicago, IL (US); Weixue Tian, Dunlap, IL (US); William Henry Baar, III, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 186 days.

(21) Appl. No.: 15/633,081

(22) Filed: Jun. 26, 2017

(65) Prior Publication Data
US 2018/0370583 A1 Dec. 27, 2018

(51) Int. Cl.
*B62D 55/21* (2006.01)
*B62D 55/088* (2006.01)
*B62D 55/26* (2006.01)

(52) U.S. Cl.
CPC ............ *B62D 55/211* (2013.01); *B62D 55/21* (2013.01); *B62D 55/0887* (2013.01); *B62D 55/26* (2013.01)

(58) Field of Classification Search
CPC ................................ B62D 55/21; B62D 55/211
See application file for complete search history.

(56) References Cited

U.S. PATENT DOCUMENTS

| 2,113,018 | A | * | 4/1938 | Fergusson | ............ | B62D 55/211 |
| | | | | | | 305/163 |
| 3,841,716 | A | | 10/1974 | Webber et al. | | |
| 4,136,913 | A | * | 1/1979 | Pietzsch | ............... | B62D 55/211 |
| | | | | | | 305/163 |
| 5,749,634 | A | * | 5/1998 | Wiesner | ............... | B62D 55/211 |
| | | | | | | 305/105 |
| 6,109,706 | A | | 8/2000 | Oertley | | |
| 8,287,056 | B2 | | 10/2012 | Sebright et al. | | |
| 2003/0219181 | A1 | | 11/2003 | Yamamoto et al. | | |
| 2010/0139993 | A1 | * | 6/2010 | Sebright | ................ | B62D 55/21 |
| | | | | | | 180/6.7 |

FOREIGN PATENT DOCUMENTS

| EP | 1047589 | 11/2000 |
| GB | 1575368 | 9/1980 |
| JP | s5514310 | 1/1980 |
| WO | 2016079813 | 5/2016 |

* cited by examiner

*Primary Examiner* — Kip T Kotter
(74) *Attorney, Agent, or Firm* — Law Office of Kurt J. Fugman LLC

(57) ABSTRACT

A track pin may comprise a body that includes a generally cylindrical configuration defining an axis of rotation, a circumferential direction and a radial direction, the body defining a first end, a second end and a peripheral surface extending from the first end to the second end. The peripheral surface may include a first lobed portion spaced axially away from the first end and the second end and including a series of convex arcuate segments and concave arcuate segments joined to each other tangentially, forming an undulating surface.

10 Claims, 14 Drawing Sheets

LOBED TRACK PIN

TECHNICAL FIELD

The present disclosure relates to a track pin that is used as a part of a track chain assembly attached to the undercarriage of track-type vehicles used for off-road operations such as those that use endless tracks for moving on the ground. Specifically, the present disclosure relates to a track pin that is lobed or scalloped in order to reduce the galling that track pins and track bushings surrounding the track pins create in use that may lead to track chain assembly and machine maintenance.

BACKGROUND

In many current applications, track pins that are surrounded by track rotating track bushings produce galling between the track pin and the bushing. This increases the friction that may occur between the track pin and bushing over time. This problem is exacerbated when lubrication fails and the track chain assembly is under a high load and rotating at a low speed. This scenario may create heat and further galling and or sticking or other malfunctioning of the track chain assembly as the track chain assembly rotates about the idler wheel(s), drive sprocket, and support rollers, etc. Eventually, the track chain assembly or portions thereof, or other components of the undercarriage of a machine using the track chain assembly may need to be replaced. This may lead to down time, maintenance costs, warranty costs, and reduced profitability of the mining, earth moving, construction, and agricultural or other similar endeavor employing the machines using such track chain assemblies.

To alleviate these problems, track bushings that have lobed or scalloped surfaces have been developed that tend to reduce the galling. However, current designs have not always been able to solve the problem to a needed or desirable extent. These previous designs may also be more expensive than desirable.

Accordingly, a track pin design that is better able to prevent or reduce galling or is more economical to produce is warranted.

SUMMARY

A track pin according to an embodiment of the present disclosure is provided for use with a track chain of a vehicle that includes a plurality of track pins and bushings. The track pin may comprise a body that includes a generally cylindrical configuration defining an axis of rotation, a circumferential direction and a radial direction, the body defining a first end, a second end and a peripheral surface extending from the first end to the second end. The peripheral surface may include a first lobed portion spaced axially away from the first end and the second end and including a series of convex arcuate segments and concave arcuate segments joined to each other tangentially, forming an undulating surface.

A track bushing according to an embodiment of the present disclosure is provided for use with a track chain assembly of a vehicle that includes a plurality of track pins and bushings. The track bushing may comprise a body including a generally cylindrical annular configuration defining an axis of rotation, a circumferential direction and a radial direction, the body also defining a first end, a second end and a bore with an inner cylindrical surface extending from the first end to the second end. The inner cylindrical surface may include a first lobed portion comprising a first convex arcuate segment, a second convex arcuate segment and a concave arcuate segment joining the first convex arcuate segment to the second convex arcuate segment tangentially, forming an undulating surface.

A track chain assembly according to an embodiment of the present disclosure is provided for use with a vehicle that includes an endless track drive. The track chain assembly may comprise a plurality of track pins and track bushings disposed about the track pins, and a plurality of track links that are connected to each other by either a track pin or a track bushing, wherein at least one track link defines a plurality of apertures for receiving a track pin or bushing and wherein each track pin defines an axis of rotation and includes a body defining a peripheral surface extending from a first end to a second end. The peripheral surface may include a first lobed portion including a plurality of convex radial arc segments each defining a first radius of curvature; and a cylindrical portion defining a second radius of curvature and the ratio of the first radius of curvature for each convex radial arc segment to the second radius of curvature of the cylindrical portion ranges from 80 to 100%.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIGS. 16 and 17 show the stress exerted on the track pin and the track bushing when the track pin has lobed features while

DETAILED DESCRIPTION

Figure 1:
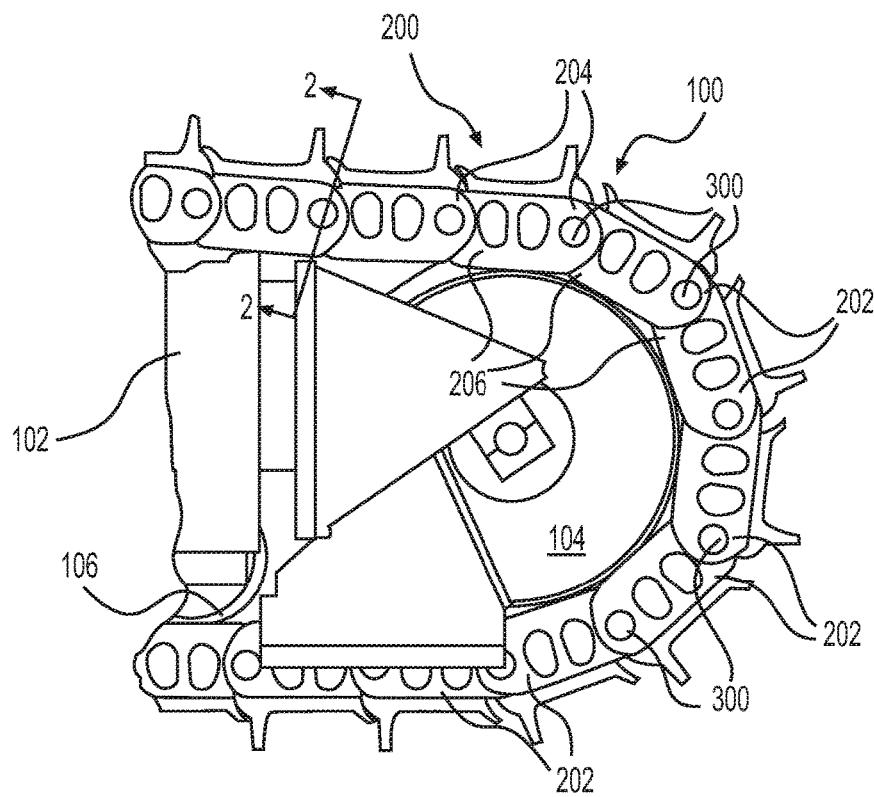
FIG. 1 is a side view of a portion of a track chain assembly of a track-type machine that employs a lobed track pin according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include a track pin, a track chain assembly using the track pin, and a machine employing the track chain assembly. The track pin may have lobed geometry that helps reduce the galling between the track pin and its surrounding track bushing or other components of a track chain assembly.

Looking at FIG. 1, it can be seen that a portion of a track chain assembly for a track-type machine is shown. The undercarriage assembly 100 includes a pair of endless track chain assemblies 200 (only one track chain assembly is shown) that are positioned in spaced parallel relation to one another and are entrained about a track roller frame 102 of the machine. The track chain assembly 200 engages a drive sprocket (not shown) that provides motive force to the track chain assembly 200, which in turn, drives the machine in a manner known in the art. The track chain assembly 200 is also entrained about at least one idler member 104 that rotatably supports the track chain assembly 200 on one end of the track roller frame 102 as viewed in FIG. 1.

Each of the track chain assembly 200 comprised of individual track links 202 that have first and second end portions 204 and 206 respectively. The individual track links 202 are pinned together in end-to-end relation with one another to form the respective continuous track chain assembly 200. Each track chain assembly 200 is positioned in spaced, parallel relation to one another on the machine.

Figure 2:
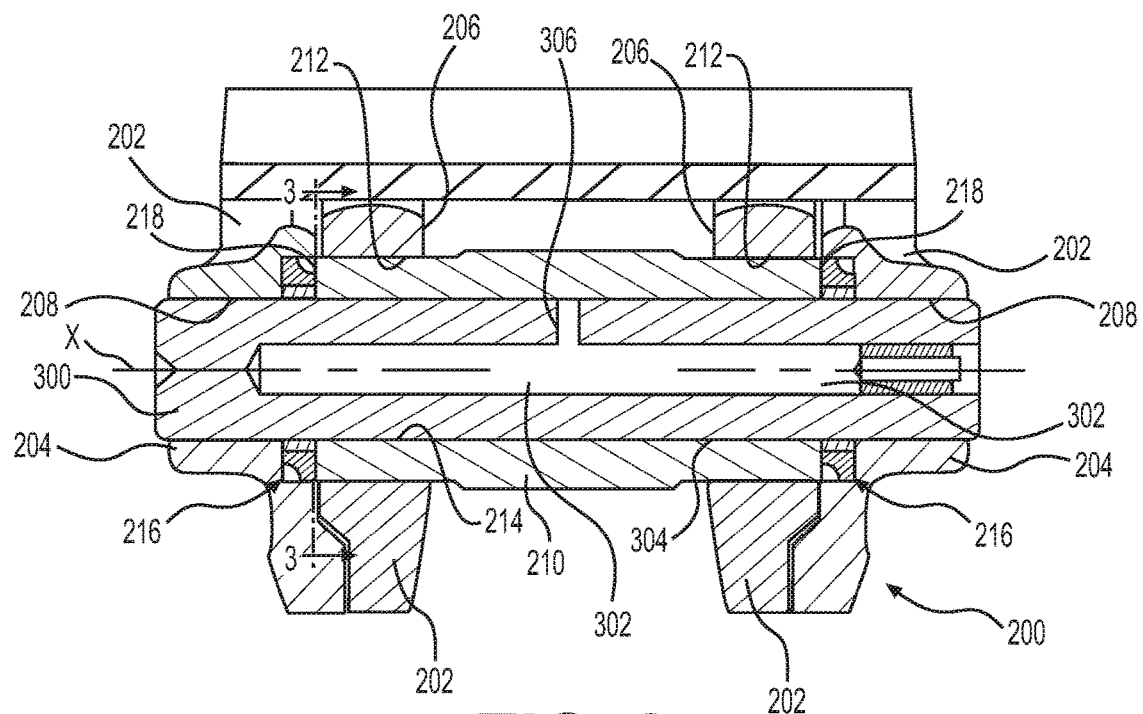
FIG. 2 is cross-sectional view of the track chain assembly of FIG. 1 taken along lines 2-2 thereof.

In an embodiment of the present disclosure shown in FIG. 2, it can be seen that the links 202 of the track chain assembly are interconnected by laterally extending track pins 300. The track pins 300 are engaged, by press fit, slip fit or any other suitable fastening method or device, with a bore 208 defined by laterally opposed first end portions 204 of the track links 202 of the track chain assembly 200. A plurality of track bushings 210 are likewise interconnected between the laterally opposed second end portions 206 of the track links 202. The track bushings 210 are received within an aperture 212 defined by the second end portions 206 of the respective track links 202 and are secured therein by a press fit, slip fit or other suitable means. The second end portions 206 of the track links 202 are offset from the first end portions 204 so as to be in lateral alignment with the first portions of the adjacent links, as can be seen in FIG. 2. This positioning places apertures 208 and 212 of the respective first and second end portions of adjacent track links in alignment with one another along a common, laterally extending axis X, as are the track pins 300 and bushings 210.

The track bushings 210 define a bore 214 in which the track pins 300 are positioned. The bore 214 is of sufficient size to establish a clearance between it and the track pin. The clearance allows the pin 300 and bushing 210 to rotate relative to one another as the track chain assembly 200 revolves around the idlers 104, support rollers 106 and sprocket (not shown) supported by the track roller frame 102. The clearance also permits lubricating fluid, from a reservoir 302 defined in the track pin 300 (FIG. 2), to coat the outer surface 304 of the track pin 300 so that the interface between the track pin 300 and the bore 214 of the bushing 210 is lubricated to reduce wear therebetween. Typically, the fluid is communicated via one or more radially directed passage 306 that extends between the reservoir 302 and the outer surface 304 of the track pin 300. A pair of track seal assemblies 216 are positioned to engage opposing end faces 218 and 218' of the bushing 210 to maintain the lubricating fluid within the reservoir 302 and the clearance.

Figure 3:
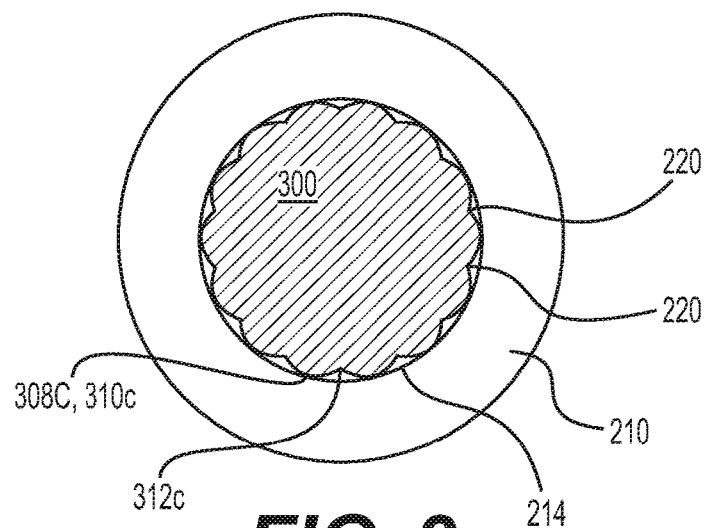
FIG. 3 is an end cross-sectional view of the track pin and track bushing of FIG. 2 taken along lines 3-3 thereof, showing lobed features in an exaggerated manner.

Turning now to FIG. 3, it can be seen that the bore 214 of the track bushing 210 is generally round in configuration and the profile of the track pin 300 is at least partially segmented or lobed. The segments 308c are defined by a plurality of arcuate curves such as radial arc segments 310c. The juncture or intersection between the segments defines an inwardly directed cusp or valley 312c that forms a clearance with respect to the bore 214. This forms channels 220 between the track pin 300 and the track bushing 210, allowing lubricating fluid to be directed to surfaces of the track pin and track bushing, helping to reduce the risk of galling.

Figure 4:
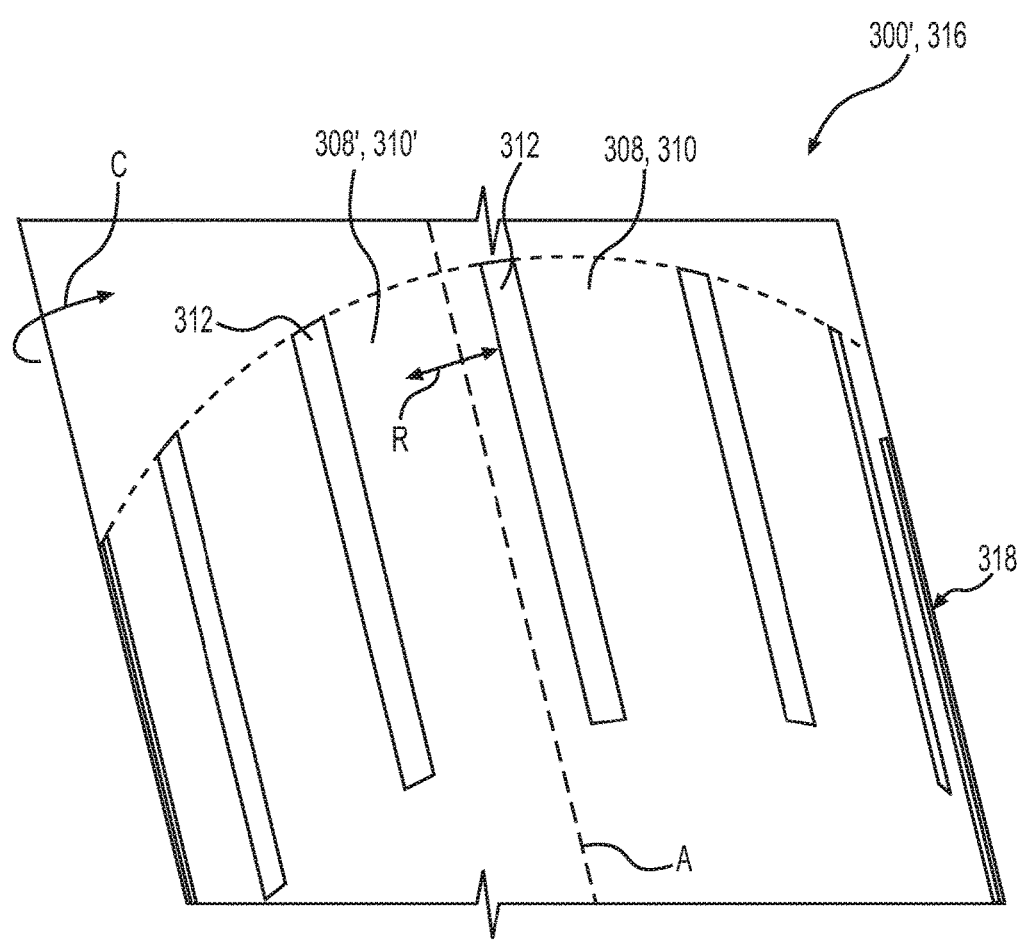
FIG. 4 is an enlarged perspective view of the track pin according to an embodiment of the present disclosure similar to the track pin of FIG. 3.
Figure 5:
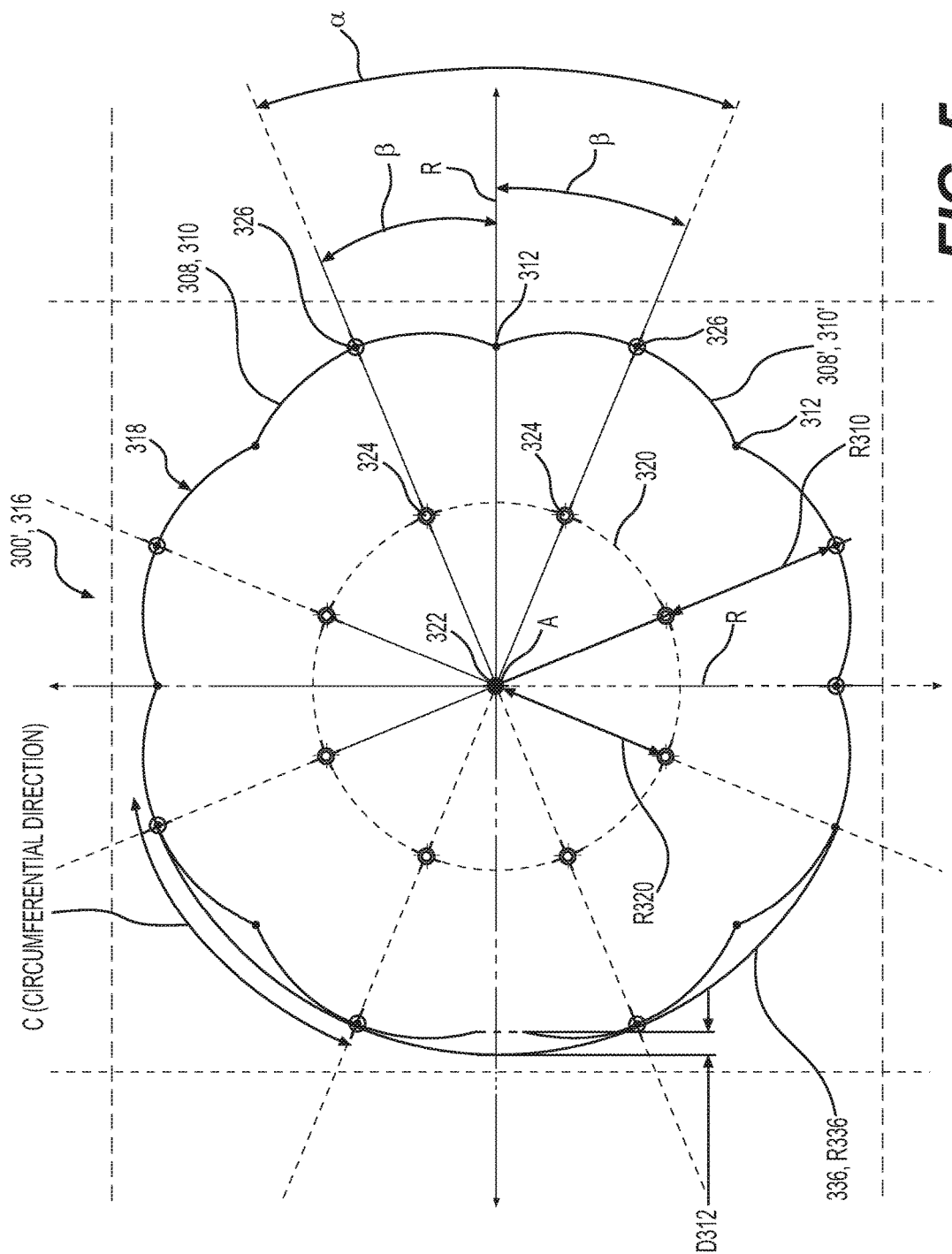
FIG. 5 is detailed end view of the track pin of FIG. 4, showing the dimensions of the track pin and its lobed features in an exaggerated manner more clearly.
Figure 6:
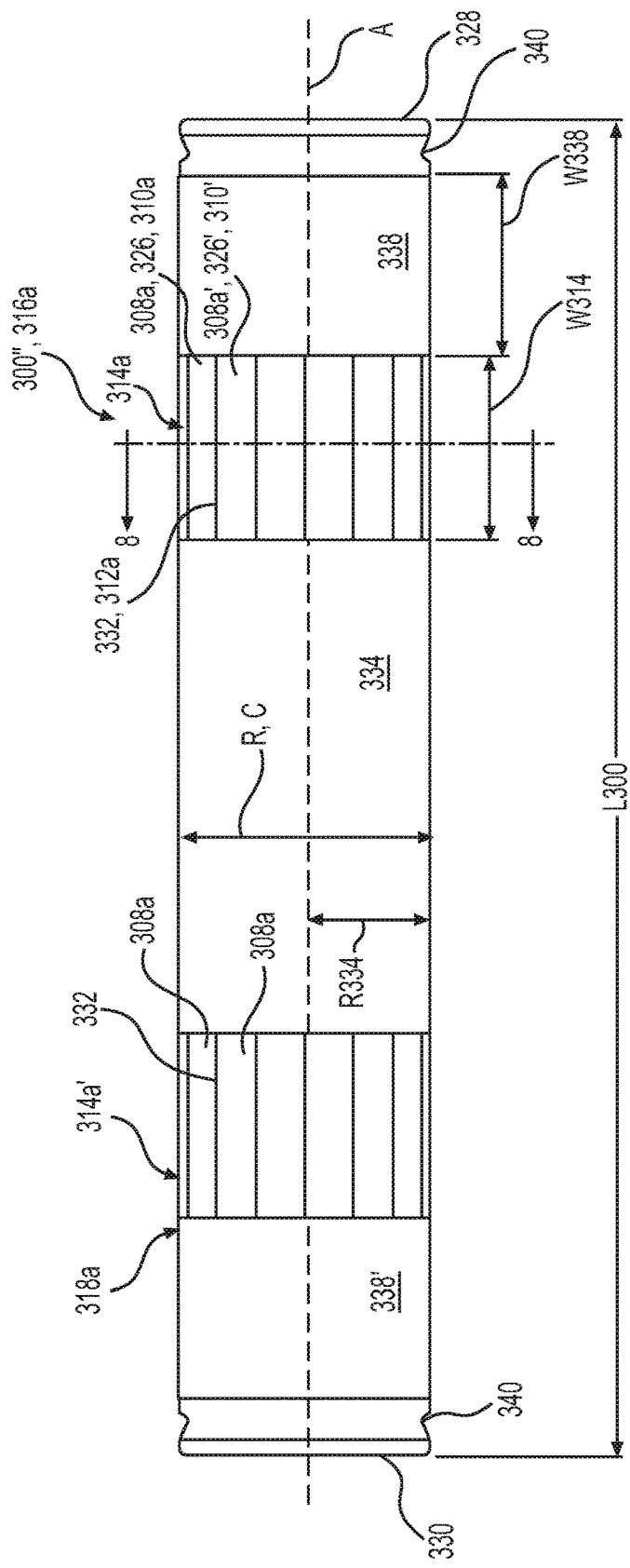
FIG. 6 is a side view of a track pin with lobed features according to an alternate embodiment of the present disclosure.
Figure 9:
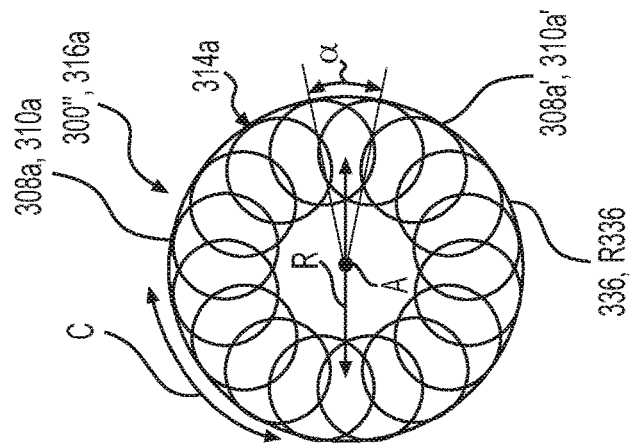
FIG. 9 is another full end view of the track pin of FIG. 6, showing the circular array of circular features forming the lobed features about the rotational axis of the track pin of FIG. 6.

FIGS. 4 and 5 depict another embodiment of a track pin 300' similar to that shown in FIG. 3. It is to be understood that FIG. 5 depicts the configuration of the lobed portion 314 of the track pin 300' in FIG. 4, in an exaggerated manner for clarity. The track pin 300' includes a body 316 that defines an axis of rotation A, a circumferential direction C, and a radial direction R. The body 316 also includes a peripheral surface 318 that may define a plurality of convex arcuate segments 308 in the form of radial segments 310. It is contemplated that any of the arcuate segments discussed herein may be formed with other types of arcuate curves including polynomial, sinusoidal, etc. The body 316 further defines a base circle 320 with a center 322 coincident with the axis of rotation A. Each of the radial segments 310 establish a center of curvature 324 that is coincident with the base circle 320.

For the embodiment shown in FIG. 5, the base circle 320 establishes a radius R320 of 14.3 mm and the radial segments 310 also establish a radius R310 of 14.3 mm. There are eight radial segments 310 evenly spaced circumferentially about the axis of rotation A. Consequently, the angle α formed from one crest 326 of one radial segment 310 to the adjacent crest 326' of the adjacent radial segment 310' is 45 degrees. Similarly, each radial segment 310 intersects the adjacent radial segment 310, forming a cusp or valley 312. As shown, the valley is sharp but smooth cusps or valleys are possible as will be discussed momentarily. Another angle β is formed from a crest to the adjacent cusp. This angle is approximately 22.5 degrees as shown in FIG. 5.

Looking now at FIGS. 6 thru 9, a track pin 300" according to another embodiment of the present disclosure with lobed features is shown. The track pin 300" comprises a body 316a that includes a generally cylindrical configuration defining an axis of rotation A, a circumferential direction C and a radial direction R. The body 316a also defines a first end 328, a second end 330 and a peripheral surface 318a extending from the first end 328 to the second end 330. The peripheral surface 318a may have a changing topography and may include a first lobed portion 314a spaced axially away from the first end 328 and the second end 330 that includes a series of convex arcuate segments 308a and concave arcuate segments 332 joined to each other tangentially, forming an undulating surface with crests 326 and valleys 312a.

Likewise, the track pin 300" may further comprise a second lobed portion 314a' spaced axially away from the first lobed portion 314a, the first end 328 and the second end 330. For the embodiment shown in FIG. 6, the first and second lobed portions 314a, 314a' are identically configured, both having convex arcuate segments 308a and concave arcuate segments 332 that are circumferentially in phase or aligned with each other. This may not be the case in other embodiments.

Figure 7:
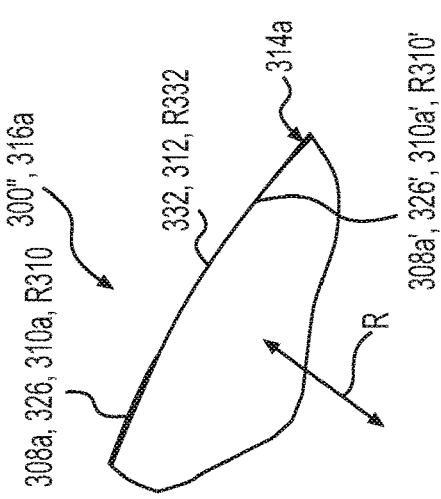
FIG. 7 is an enlarged end view of the perimeter of the track pin of FIG. 6.

More particularly, for the embodiment of the track pin shown in FIGS. 6 thru 9, the first lobed portion 314a includes a plurality of evenly circumferentially spaced convex arcuate segments 308a with one convex arcuate segment being circumferentially adjacent another convex arcuate segment, wherein each convex arcuate segment 308a defines a crest 326 and the crest 326 of one convex arcuate segment 308a forms an angle α' with the crest 326' of the adjacent convex arcuate segment 308a' defined by radial lines passing through the axis of rotation A and the respective crests of the convex arcuate segments. The angle α' is shown to be approximately 22.5 degrees since sixteen radial segments 310a (i.e. each convex arcuate segment is an arc of a radius) are arranged in a circular array about the axis of rotation A. For this particular embodiment, as best seen in FIG. 7, the radius R310 of the radial segment 310a is approximately 25 mm (may be 25.03375 mm). Another angle β' is formed by radial lines passing through a valley 312a and a crest 326 that are adjacent to each other as previously described. For this embodiment, this angle β' is half of the other angle, being approximately 11.25 degrees.

Figure 8:
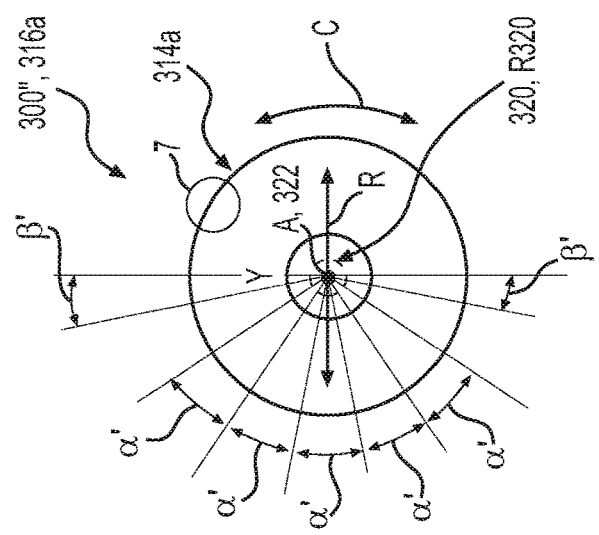
FIG. 8 is a full end view of the track pin of FIG. 6, showing the dimensions of the lobed features.

As alluded to earlier herein, each convex arcuate segment 308a nearly intersects with an adjacent convex arcuate segment 308a' forming a cusp or valley 312a. For this particular embodiment, a concave arcuate segment 332 may be interposed between and tangential to each convex arcuate segment 308a and the adjacent convex arcuate segment 308a'. The concave arcuate segment 308a may also comprise an arc of a radius R332 that may have a value of approximately 28 mm (may be 28.6255 mm). Furthermore, as best seen in FIG. 8, the body 316a of the track pin 300" may further define a base circle 320 with a center 322 coincident with the axis of rotation A and having a radius R320 ranging from 3 mm to 4 mm (may be 3.57625 mm).

In some embodiments, the arc of a radius R310 of each convex arcuate segment 308a is centered on the base circle 320.

Still referring to FIGS. 6 thru 9, the first lobed portion 314a is nearer the first end 328 than the second end 330, and the second lobed portion 314a' is nearer the second end 330 than the first end 328. Also, the peripheral surface 318a further defines a cylindrical portion 344 disposed axially between the first lobed portion 314a and the second lobed portion 314a'. The cylindrical portion 334 defines a radius R334, and the first lobed portion 334 defines a circle 336 (see FIGS. 5 and 9) that is tangential to the convex arcuate segments 308a, the circle 336 having a radius R336 that is less than the radius R334 of the cylindrical portion 334 (referring back to FIG. 6). This may be the result of machining the lobed portion 314a into the peripheral surface 318a of the pin 300". This process and resulting geometry may be different in other embodiments.

For example, a single lobed portion may be used that spans the majority of the axial length L300 of the track pin 300", eliminating the center cylindrical portion 334. Or, the radius R334 of the center cylindrical portion may be slightly less than that of the circle 336 tangent to the convex arcuate segments 308a. The axial width W314 of either the first or second lobed portion may be designed to be commensurate with the width of an inner track link that will impart load to the track bushing and track pin. In some embodiments, the axial width W314 of the first and second lobed portions may range from 40 mm to 45 mm (may be 42 mm) in some embodiments.

A first press-fit portion 338 is provided between the first end 328 and the first lobed portion 314a and a second press-fit portion 338' is provided between the second end 330 and the second lobed portion 314a'. The first and second press-fit portions 338, 338' are provided to be press fit into track links as discussed earlier herein. Accordingly, the first and second press-fit portions have axial widths W338 that match the depth of the bores of the link into which they are press-fit. In some embodiments, the axial width W338 of the press fit portions may range from 35 mm to 45 mm (may be approximately 42 mm). A circumferential groove 340 may also be provided proximate the first end 328 or the second end 330 to allow the receipt of a retaining ring or to allow deformation or the receipt of a deformed part of the track link such as by swaging at the end of the track pin for retaining the track pin, etc. The overall axial length L300 of the track pin 300" may range from 290 mm to 310 mm (may be approximately 304 mm) in some embodiments.

FIGS. 10 thru 13 illustrate another embodiment of a track pin 300''' that is identically configured to the track pin 300" of FIGS. 6 thru 9 except for the following differences. Instead of sixteen convex arcuate segments being used, twelve convex arcuate segments 308b are employed, having the same radius R310. These twelve convex arcuate segments are arranged centered on the same base circle 320, also having the same radius R310, in a circumferentially evenly spaced manner, forming a circular array about the axis of rotation A. This yields an angle α" from crest 326 to crest 326', defined in the same manner as previously described herein, which may be approximately 30 degrees. Similarly, the angle β" from a valley 312b to an adjacent crest 326, defined in a manner as previously described herein, which may be approximately 15 degrees. A concave arcuate segment 332 is provided to create the valley 312b, connecting one convex arcuate segment 308b to an adjacent convex arcuate segment 308b'. This radius R332' may have a value of approximately 10 mm as opposed to 28 mm for R332 mentioned previously.

Figure 10:
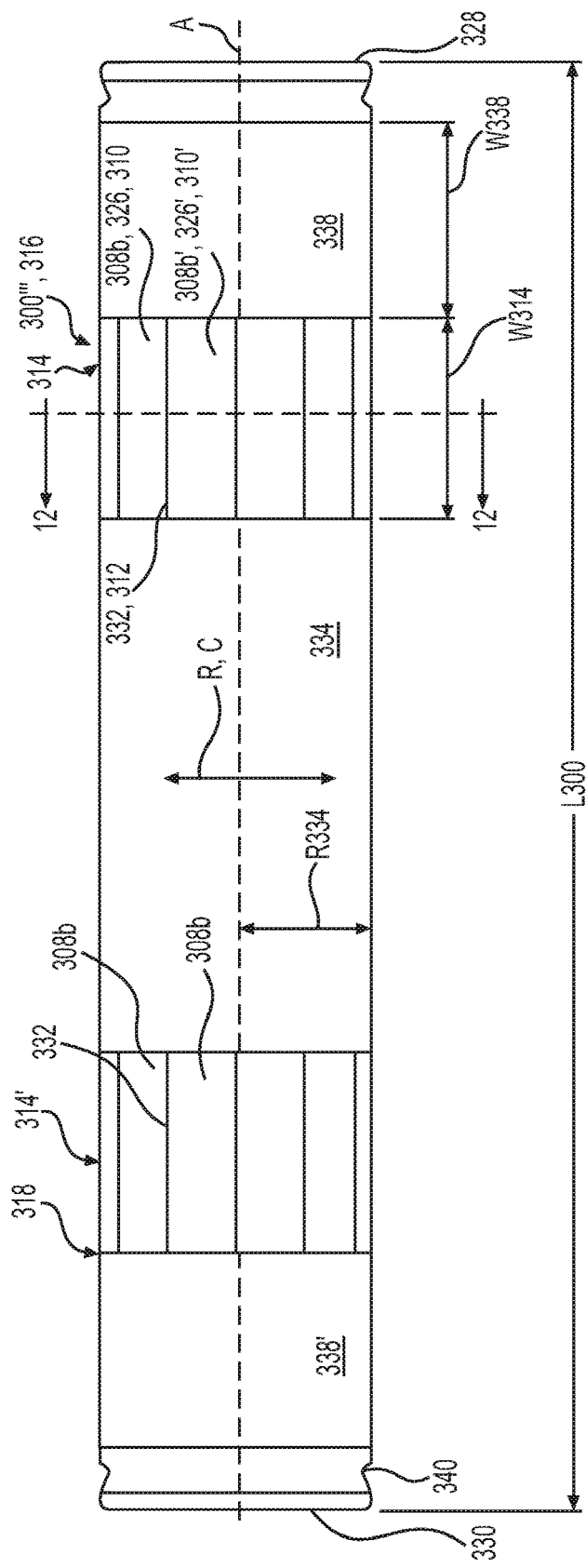
FIG. 10 is a side view of a track pin with lobed features according to yet another alternate embodiment of the present disclosure.
Figure 11:
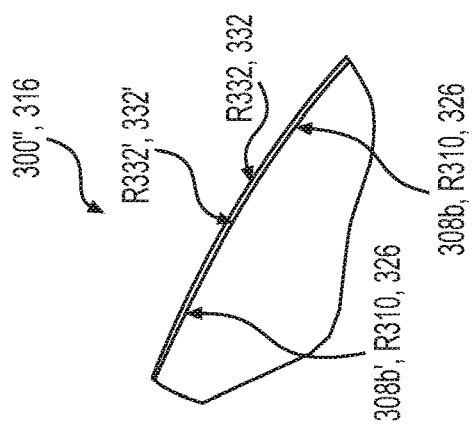
FIG. 11 is an enlarged end view of the perimeter of the track pin of FIG. 10.
Figure 12:
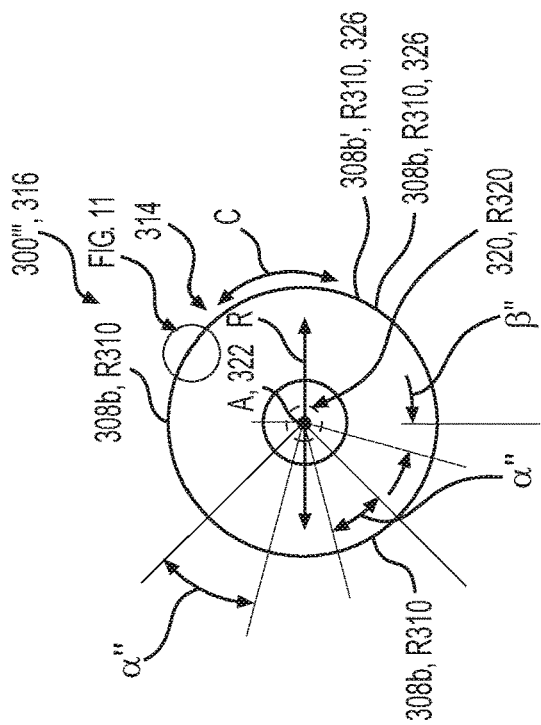
FIG. 12 is a full end view of the track pin of FIG. 10, showing the dimensions of the lobed features.
Figure 13:
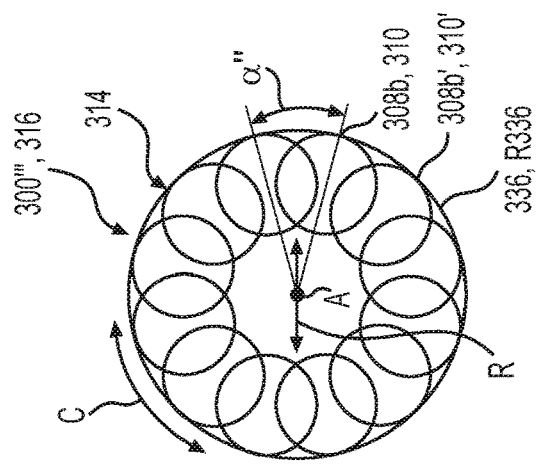
FIG. 13 is another full end view of the track pin of FIG. 10, showing the circular array of circular features forming the lobed features about the rotational axis of the track pin of FIG. 10.

Given the embodiment of the track pin 300 disclosed in FIG. 3, the track pin 300' disclosed in FIGS. 4 and 5, the alternate embodiment of a track pin 300" disclosed in FIGS. 6 thru 9, and the yet further embodiment of a track pin 300''' disclosed in FIGS. 10 and 13, and other considerations regarding manufacturing tolerances and possible applications of the track pin, it is contemplated that certain angles and dimensions may have the following ranges of values. Regarding the angle α, α', α" measured from crest to crest, this angle may range from 20 to 50 degrees for some embodiments. Concerning the value of the radius R310 for the arc of the radius for the convex arcuate segments, this radius may range from 20 to 30 mm for certain embodiments and may be the same value for each convex arcuate segments in certain embodiments. The base circle 320 with a center 322 coincident with the axis of rotation A, which is used to form the circular array of convex arcuate segments, may have a radius R320 ranging from 2 to 15 mm in some embodiments. The arc of a radius R332 defining the concave arcuate segment may have a radius ranging from 5 to 30 mm in some embodiments.

Figure 15:
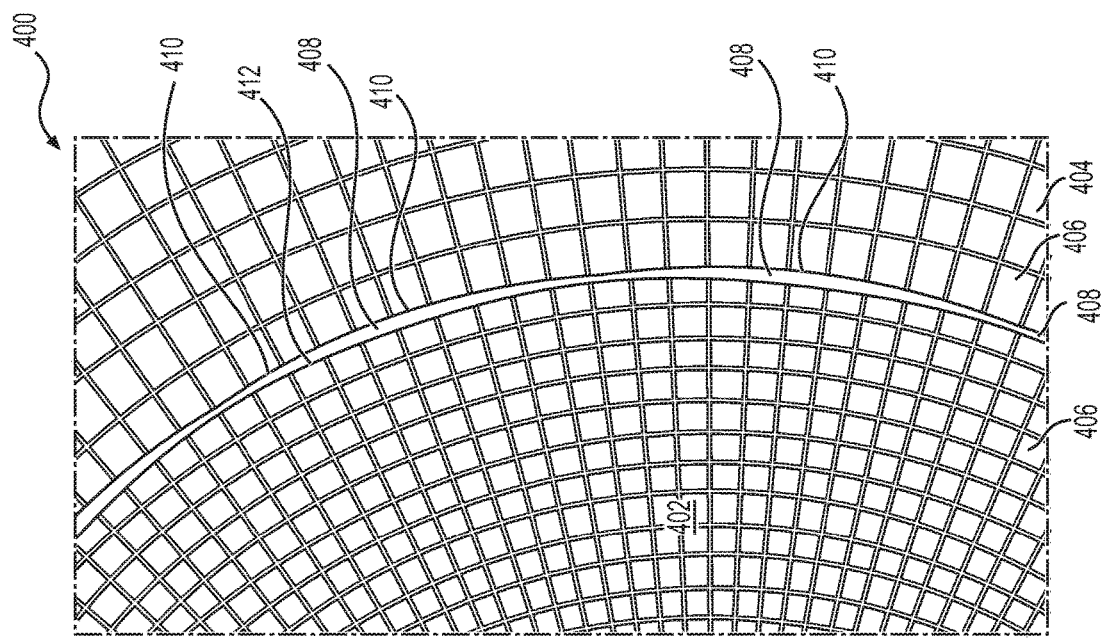
FIG. 15 is an enlarged view of a portion of the FEA model of the FIG. 14, showing more clearly the gap and interface between the track bushing and track pin.
Figure 14:
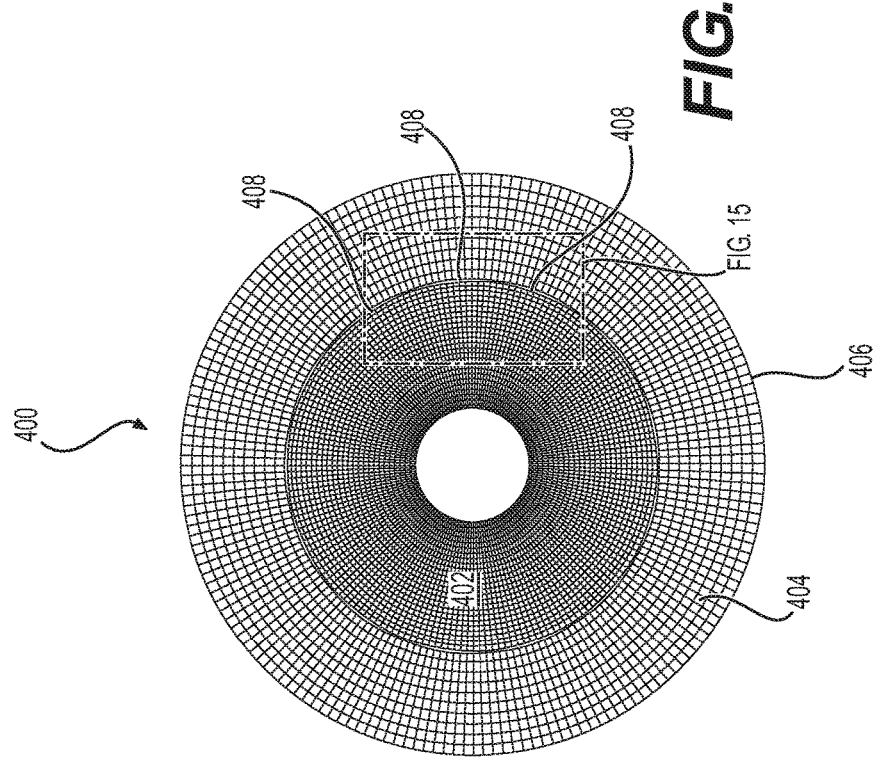
FIG. 14 shows the end view of the FEA model of the track bushing and track pin of FIGS. 4 and 5.

FIGS. 14 and 15 show the finite element model 400 used in a finite element analysis (FEA) for a track pin 402 and track bushing 404 according to an embodiment of the present disclosure. As can be seen, a plurality of brick type finite elements 406 are used for both the track pin 402 and the track bushing 404. The mesh has a suitable density of elements 406. As best seen in FIG. 15, three depressions or valleys 408 are modeled as well as three crests 410 along the peripheral surface 412 of the track pin 402. The inventors used this model to analyze the stress exerted on the pin 402 under load. A similar model was also set up for a track pin not having lobed features.

Figure 16:
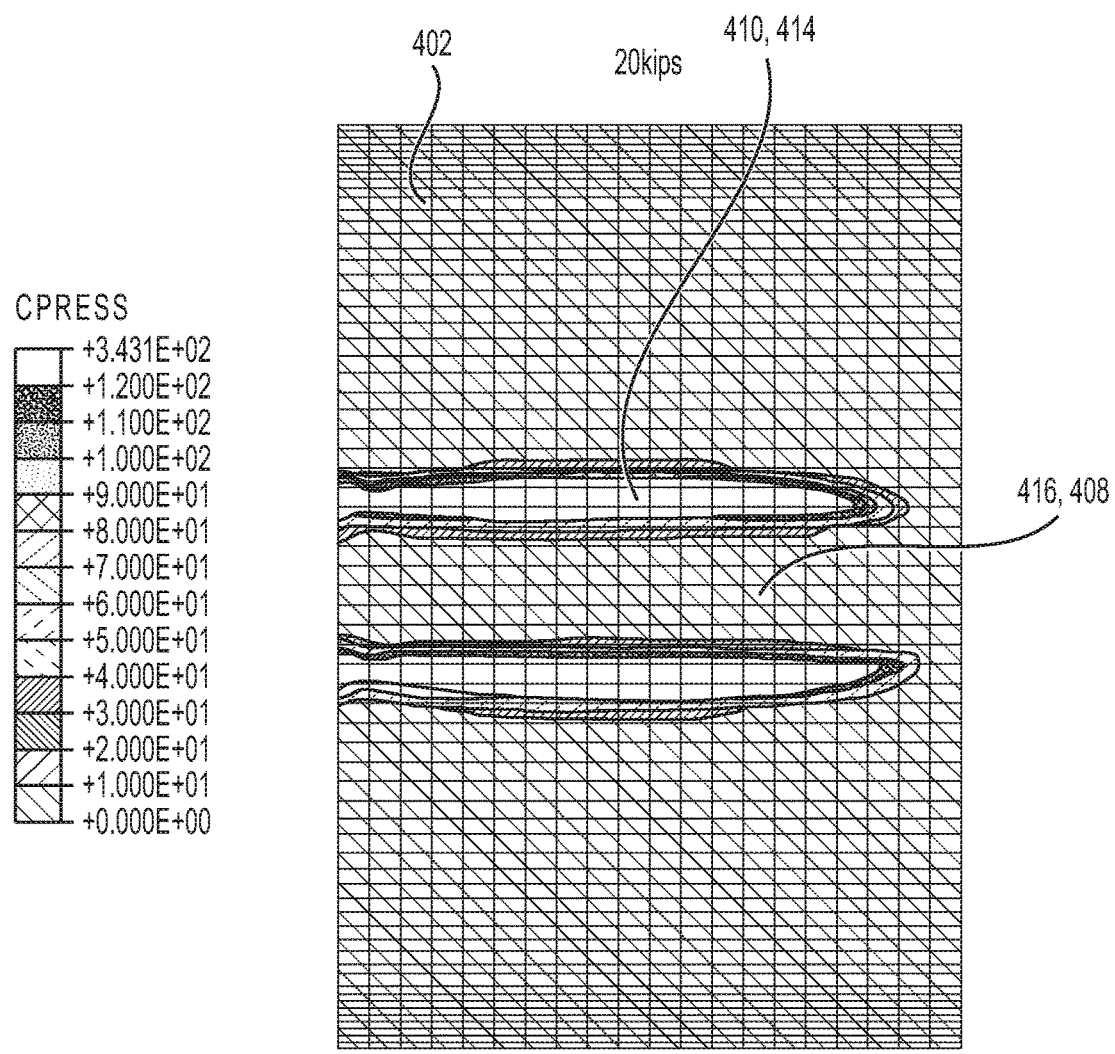
Figure 18:
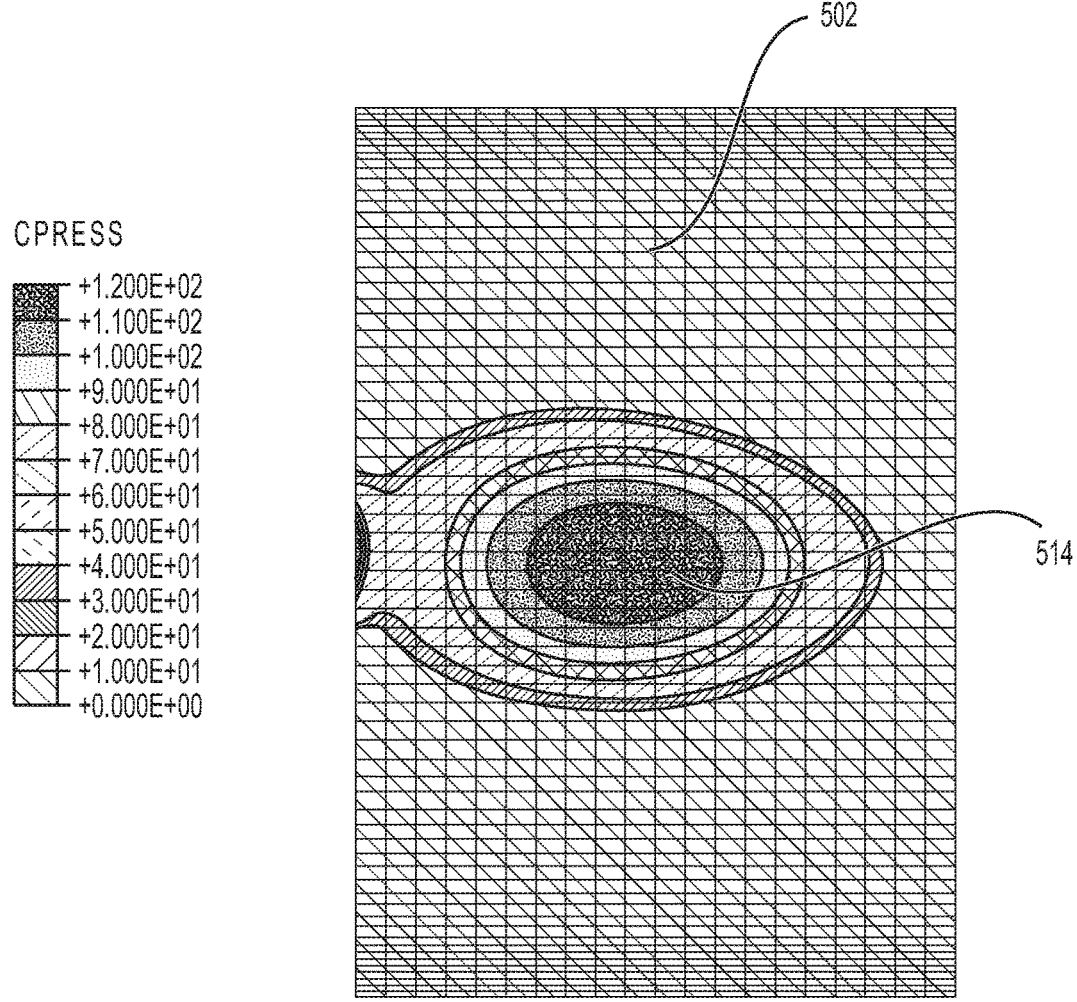
FIGS. 18 and 19 illustrate the stress exerted on the track pin and the track bushing when the track pin lacks lobed features.

FIG. 16 shows the track pin under a load of 20 kips (20,000 lbs-f). As can be seen, the crests 410 show areas 414 of high stress where there may be some slight oil starvation. However, these areas 414 do not extend completely along the width of the model and are separated by areas of low stress 416 (corresponding to the valleys 408), indicating that some lubrication may spread circumferentially. Also, since the track pin 402 often rotates about 30 degrees during use of a track chain assembly, the areas of high stress would move so that the same area does not remain starved of oil for a prolonged period of time, reducing the likelihood of galling. In contrast, FIG. 18 shows the track pin 502 without lobed features as is known in the art, showing an area of high stress 514 that is larger circumferentially than any corresponding areas shown in FIG. 16. This means that as the track pin 502 of FIG. 18 rotates 30 degrees, part of the high stress area 514 may remain in high stress, increasing the likelihood of oil starvation and galling as compared to the track pin 402 of FIG. 16.

Figure 17:
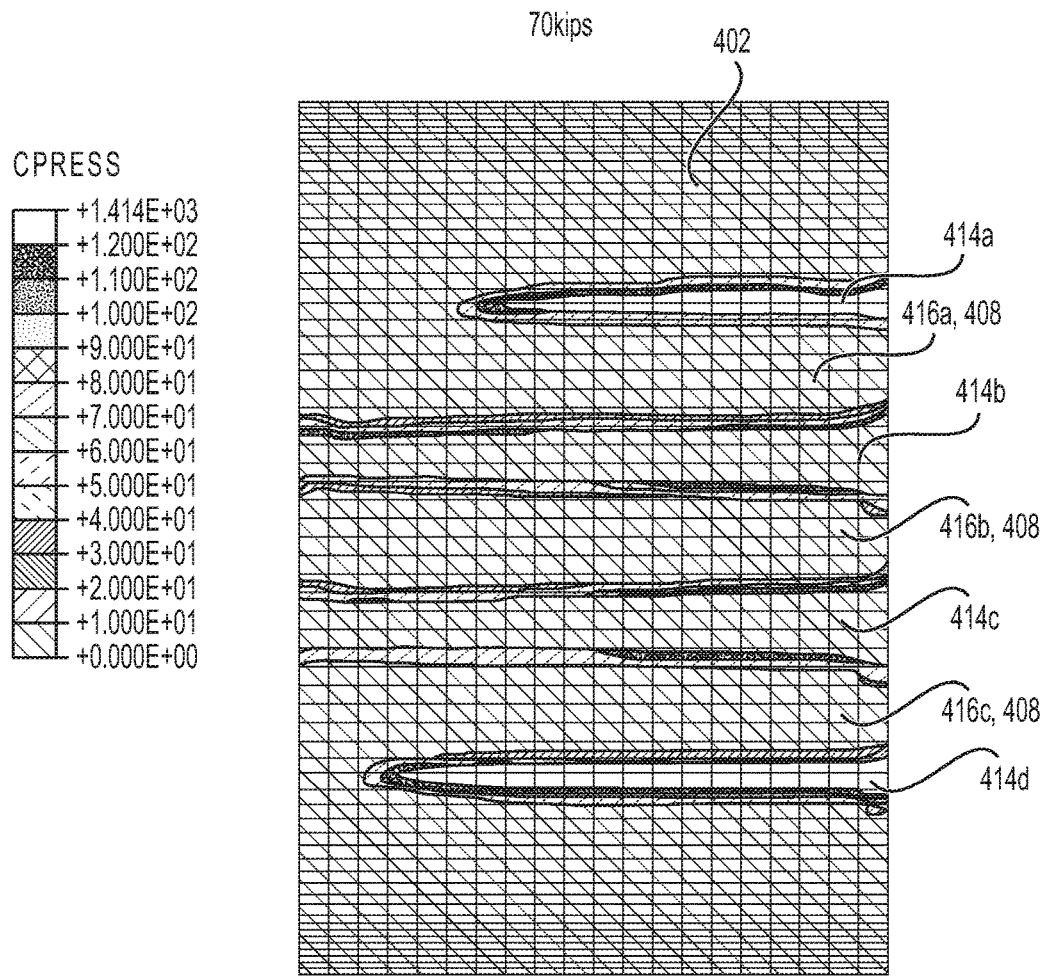
Figure 19:
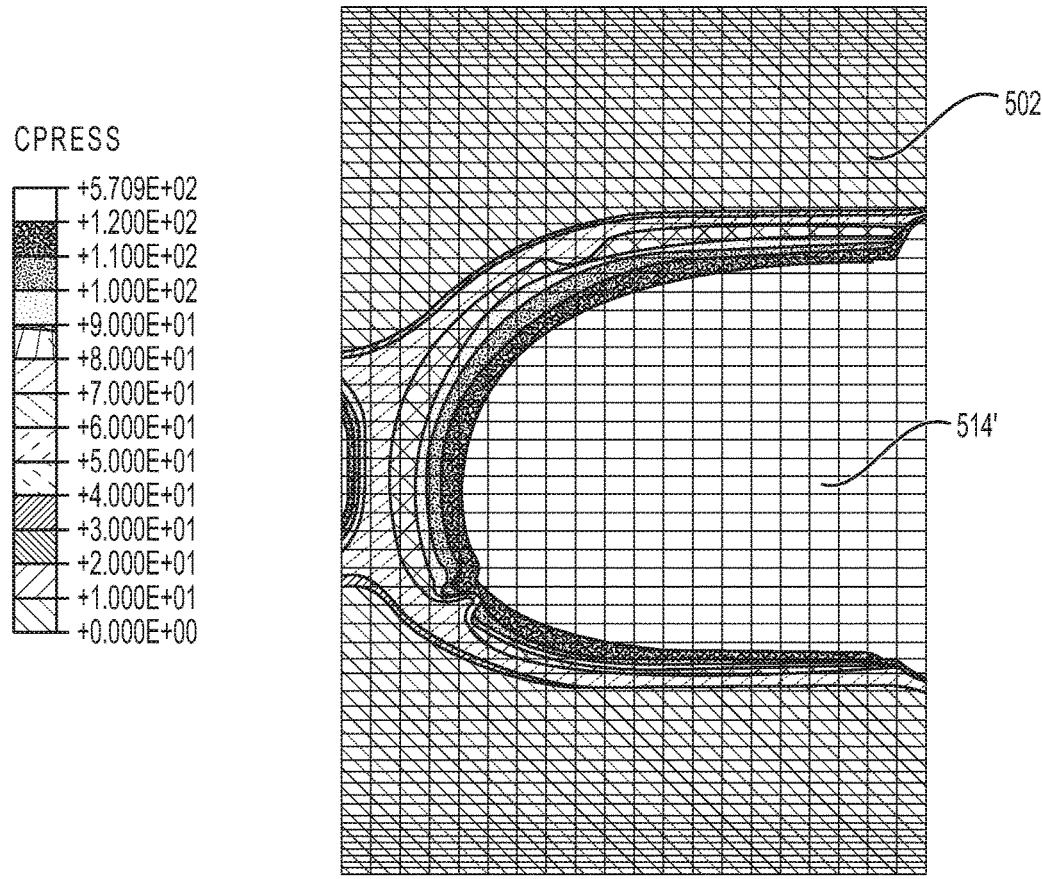

The improvement provided by a lobed track pin is shown more dramatically in FIG. 17. In FIG. 17, the track pin 402 is under a load of 70 kips (70,000 lbs-f). As can be seen, four high stress areas 414a, 414b, 414c, 414d are shown, two areas 414b, 414c of which extend the entire width of the model. However, these areas are separated by areas of low stress 416a, 416b, 416c corresponding to the valleys 408. Again, as the track pin 402 rotates about 30 degrees, the areas of high stress would be moved to areas of low stress, indicating that no one area would be subjected to oil starvation for an extended period of time, reducing the likelihood of galling. On the other hand, FIG. 19 shows a track pin 502 without lobed features, showing an area 514' of high stress that extends more than 30 degrees circumferentially. This indicates that galling is likely to occur as at least a part of the high stress area would likely remain starved of lubrication for an extended period of time.

As can be seen, a track pin according to any embodiment of the present disclosure may provide benefits that reduce the likelihood of galling. The FEA study supports the inventors' theory that there may be a tradeoff by creating crests and valleys to try and prevent galling. At high rotational speeds, the hydrodynamic forces of the pin in the bushing help maintain a layer of lubrication between the pin and the bushing. However, at low rotational speeds, and especially at high loads, areas of the pin may become starved of oil. By adding crests and valleys, this may allow better spreading of the lubrication but, at the same time, may create locally higher stresses at the crests. Hence, there may be no improvement if these design compromises are not broken. However, given the geometry described herein, the inventors have broken this compromise and found a way to reduce the likelihood of galling at low rotational speeds and high loads.

Referring again to FIGS. 6 thru 13, a track pin 300", 300''' comprising a body including a generally cylindrical configuration defining an axis of rotation A, a circumferential direction C and a radial direction R may be provided. The body may define a first end 328, a second end 330 and a peripheral surface 318 extending from the first end 328 to the second end 330, and the peripheral surface 318 may include a first lobed portion 314 spaced axially away from the first end 328 and the second end 330. The first lobed portion 314 may include lobed features comprising a first convex arcuate segment 308, a second convex arcuate segment 308' and a concave arcuate segment 332 joining the first convex arcuate segment 308 to the second convex arcuate segment 308' tangentially. In many instances, the convex arcuate segments 308 and concave arcuate segment 332 are repeated as a circular array about the axis of rotation A. The alternating arrangement of crests and valleys with smooth transitions may help keep the stress on the pin low under load.

While specific embodiments of a track pin with lobed features has been discussed, it should be noted that dimensions, angles, configurations of features of the track pin or the track pin itself, may be modified as needed or desired in manner not specifically discussed herein. Nonetheless, these alternatives are to be considered part of the present disclosure.

A track chain assembly for use with a vehicle or machine that includes an endless track drive, such as shown in FIG. 1, may be provided. The track chain assembly 200 may comprise a plurality of track pins 300 and track bushings 210 disposed about the track pins 300, and a plurality of track links 202 that are connected to each other by either a track pin 300 or a track bushing 210, wherein at least one track link 202 comprises defines a plurality of apertures 212 for receiving a track pin 300 or bushing 210.

Looking at FIGS. 6 thru 13, each track pin 300 includes a body 316 defining a peripheral surface 318 including a first lobed portion 314 including a plurality of convex radial arc segments 310 each defining a first radius of curvature R310, and a cylindrical portion 334 defining a second radius of curvature R334 and the ratio of the first radius of curvature R310 for each convex radial arc segment to the second radius of curvature R334 of the cylindrical portion ranges from 80 to 100% in some embodiments. In many instances, the first radius of curvature R310 is the same for each convex radial arc segment 310 and the ratio of the first radius of curvature to the second radius of curvature may range from 85 to 90%, and may be approximately 87%. In embodiments where a central cylindrical portion 334 is omitted, than the press-fit portions 338 may act as the cylindrical portion when determining this ratio.

In many embodiments, the convex radial arc segments are evenly spaced from each other such that one convex radial arc segment is adjacent circumferentially another convex radial arc segment as previously described with reference to convex arcuate segments. Also, each convex radial arc segment may define a crest and the crest of one radial arc segment forms an angle with the crest of an adjacent radial arc segment defined by radial lines passing through the axis of rotation and the respective crests of the convex radial arc segment. This angle α may range from 20 to 50 degrees.

Referring now to FIG. 5, the crests 326 of the convex radial arc segments 310 define a circle 336 tangent to the crests 326, the concave radial arc segments (see R332) define a valley 312 between two adjacent crests 326, and the maximum radial distance D312 from the circle 336 tangent to the crests 326 of the convex radial arc segments 310 to the valley 312 defined by the concave radial arc segment may range from 0 to 4 mm in many embodiments.

It is further contemplated that the lobed features of any embodiment of track pin discussed herein may be mirrored about a cylindrical surface positioned at the interface between the track pin and track bushing, such that the lobed features are on the track bushing instead of the track pin.

Figure 21:
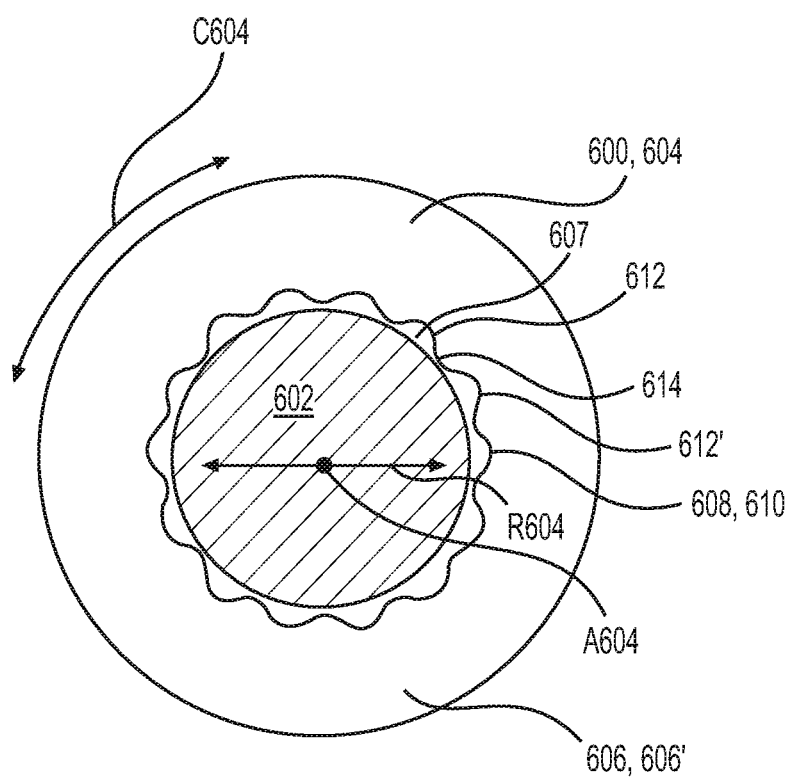
FIG. 21 illustrates a track bushing with lobed features on the surface of its bore that may mirror the lobed features discussed herein with respect to various embodiments of the track pin.

More particularly, looking at FIG. 21, a track bushing 600 may be provided for use with a track chain assembly of a vehicle that includes a plurality of track pins 602 and bushings 600. The track bushing 600 may comprise a body 604 including a generally cylindrical annular configuration defining an axis of rotation A604, a circumferential direction C604 and a radial direction R604, the body defining a first end 606, a second end 606' and a bore 607 with an inner cylindrical surface 608 extending from the first end 606 to the second end 606'. The inner cylindrical surface 608 may include a first lobed portion 610 comprising a first convex arcuate segment 612, a second convex arcuate segment 612' and a concave arcuate segment 614 joining the first convex arcuate segment 612 to the second convex arcuate segment 612' tangentially. In many instances, the convex arcuate segments 612 and concave arcuate segment 614 are repeated as a circular array about the axis of rotation A604.

INDUSTRIAL APPLICABILITY

In practice, a track chain assembly, a track pin, or a track bushing may be sold, manufactured, bought etc. and attached to the machine in the aftermarket or original equipment scenarios. That is to say, the machine may be sold with the track chain assembly and track pin or track bushing according to embodiments described herein or the machine may be retrofitted, repaired, refurbished to use any of the embodiments discussed herein. The track pin or track bushing may be machined from a single piece of material to provide a suitable undulating profile or the track bushing or track pin may include an assembly of multiple components. In other embodiments, the undulating profile may be added to the track pin or track bushing by fastening, welding, etc. Continuous undulating profiles may also be added as one piece or in segments to track pin or a track bushing, etc.

Figure 20:
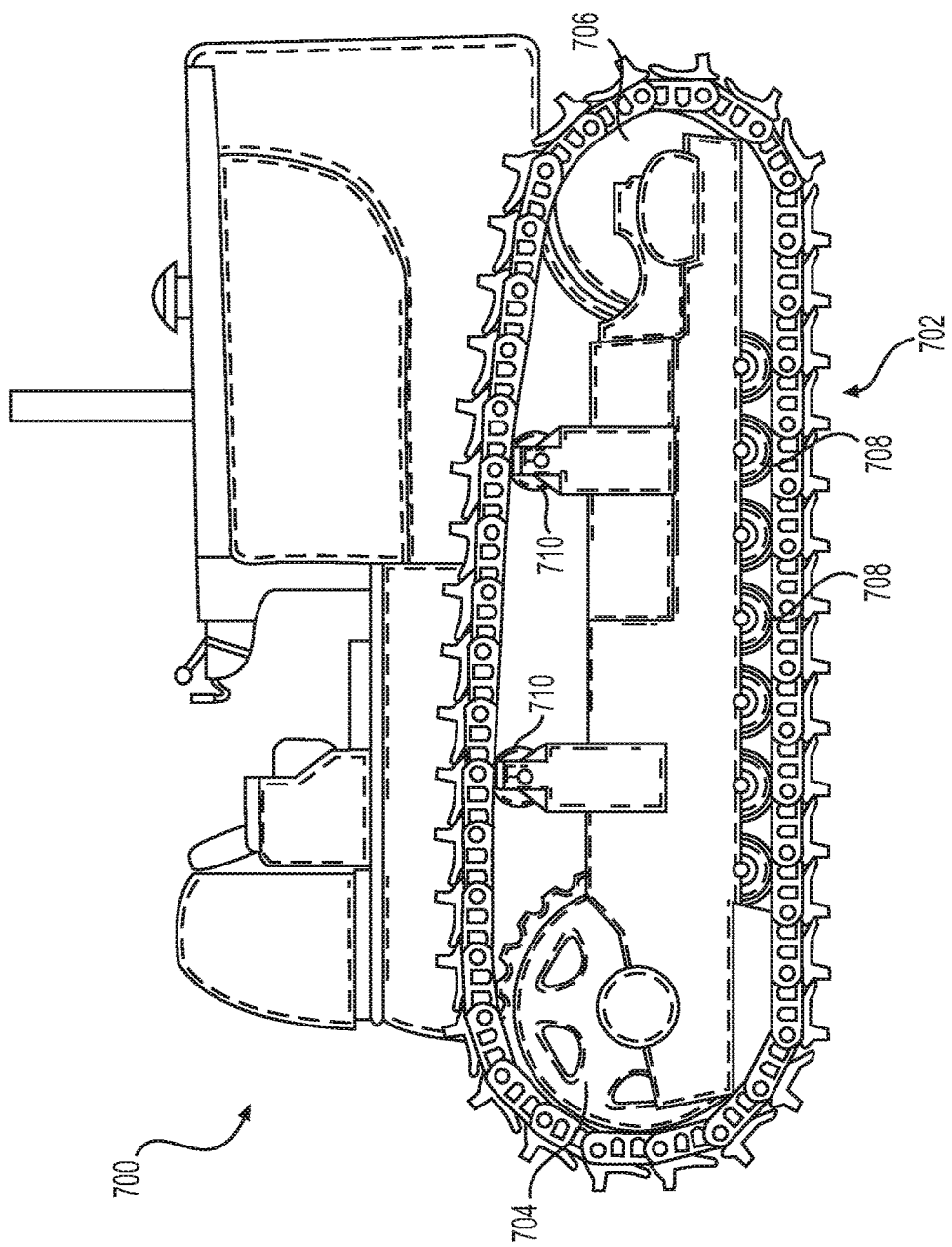
FIG. 20 illustrates a full side view of a track-type tractor that may employ a track chain assembly using a lobed track pin according to various embodiments of the present disclosure.

FIG. 20 illustrates a track-type tractor 700 employing a pair of endless track chain assemblies 702 (only one shown). Although the track assembly is particularly adapted for use on a tractor, it should be understood that the track assembly will find application to other vehicles, such as track-type excavators or any other type of off-road vehicle or machinery. In the tractor application illustrated in FIG. 20, each track chain assembly 702 is mounted in a conventional manner on a drive sprocket 704, an idler 706, a plurality of longitudinally spaced track rollers 708, and a pair of upper guide or carrier rollers 710, when needed. To some skilled in the art, this machine is a light weight machine but heavy weight machines such as those used in the mining industry are also contemplated to be within the scope of the present disclosure, as well as any other machine that may use a track chain assembly.

Virtually any track chain assembly that is known or that will be devised in the art may use a track pin or track bushing according to any embodiment discussed herein. Accordingly, track chain assemblies having straight links, offset links, etc. are included in the scope of the present disclosure. Also, track chain assemblies that are assembled using subassemblies, such as when a pin with collars rotating about the pin is provided, are considered to be within the scope of the present disclosure. A method and device for mechanically interlocking the pin within the bores of the track link may be provided.

For example, any type of method for mechanically interlocking the pin to the links that is known or that will be devised in the art may be employed. One mechanically interlocking method comprises a circumferentially disposed, generally arcuate shaped groove formed about each of the end portions of the pin and at least one mechanically formed nodule which protrudes radially inwardly from each of the bores into a respective one of the grooves. The mechanically formed nodules are preferably formed by using a punch device. Preferably, a pair of such punch devices are located perpendicular to the pin axis on each of the flats provided on the pin boss. The application of a sufficient force of the punch devices will result in the extrusion of the boss metal into the groove. Other methods for achieving this are also available and may be used.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track pin for use with a track chain of a vehicle that includes a plurality of track pins and bushings, the track pin comprising:
 a body that includes a generally cylindrical configuration defining an axis of rotation, a circumferential direction and a radial direction, the body defining a first end, a second end and a peripheral surface extending from the first end to the second end, the peripheral surface including
- a first lobed portion spaced axially away from the first end and the second end and including a series of convex arcuate segments and concave arcuate segments joined to each other tangentially, forming an undulating surface about the entirety of the peripheral surface along the circumferential direction.

2. The track pin of claim 1 further comprising:
a second lobed portion spaced axially away from the first lobed portion, the first end and the second end; and wherein the first and second lobed portions are identically configured and the convex arcuate segments and the concave arcuate segments are circumferentially in phase with each other.

3. The track pin of claim 2 wherein the first lobed portion is nearer the first end than the second end, the second lobed portion is nearer the second end than the first end, and the peripheral surface further defines a cylindrical portion disposed axially between the first lobed portion and the second lobed portion, the cylindrical portion defining a radius, and the first lobed portion defines a circle that is tangential to the convex arcuate segments having a radius that is less than the radius of the cylindrical portion.

4. The track pin of claim 1 wherein the first lobed portion includes a plurality of evenly circumferentially spaced convex arcuate segments with one convex arcuate segment being circumferentially adjacent another convex arcuate segment, wherein each convex arcuate segment defines a crest and the crest of one convex arcuate segment forms an angle with the crest of the adjacent convex arcuate segment defined by radial lines passing through the axis of rotation and the respective crests of the convex arcuate segments, and the angle ranges from 20 to 50 degrees.

5. The track pin of claim 4 wherein each convex arcuate segment is an arc of a radius.

6. The track pin of claim 5 wherein the arc of the radius has a radius ranging from 20 to 30 mm.

7. The track pin of claim 4 wherein each convex arcuate segment is a radius and nearly intersects with an adjacent convex arcuate segment that is a radius with a concave arcuate segment interposed between and tangential to each convex arcuate segment and the adjacent convex arcuate segment.

8. The track pin of claim 7 wherein the concave arcuate segment is an arc of a radius ranging from 5 to 30 mm.

9. The track pin of claim 8 wherein the body further defines a base circle with a center coincident with the axis of rotation and having a radius ranging from 2 to 15 mm and the arc of a radius of each convex arcuate segment is centered on the base circle.

10. The track pin of claim 9 wherein the radius of the base circle ranges from 3 to 4 mm.

* * * * *